(12) United States Patent
Nishizawa et al.

(10) Patent No.: US 9,416,744 B2
(45) Date of Patent: Aug. 16, 2016

(54) EXHAUST GAS PURIFICATION DEVICE FOR AN INTERNAL COMBUSTION ENGINE

(71) Applicant: Mitsubishi Heavy Industries, Ltd., Tokyo (JP)

(72) Inventors: Kazuki Nishizawa, Tokyo (JP); Daisuke Sato, Tokyo (JP); Tomohide Yamada, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 14/436,468

(22) PCT Filed: Nov. 7, 2012

(86) PCT No.: PCT/JP2012/078836
§ 371 (c)(1),
(2) Date: Apr. 16, 2015

(87) PCT Pub. No.: WO2014/073052
PCT Pub. Date: May 15, 2014

(65) Prior Publication Data
US 2015/0260119 A1    Sep. 17, 2015

(51) Int. Cl.
*F01N 3/023* (2006.01)
*F01N 3/035* (2006.01)
(Continued)

(52) U.S. Cl.
CPC .......... *F02D 41/1445* (2013.01); *F01N 3/023* (2013.01); *F01N 3/035* (2013.01);
(Continued)

(58) Field of Classification Search
CPC ......... F01N 3/023; F01N 3/035; F01N 9/002; F01N 2900/0408; F01N 2900/1411; F01N 2900/1602; F01N 2900/1606; F02D 41/0002; F02D 41/1445; F02D 41/405; Y02T 10/47
See application file for complete search history.

(56) References Cited

U.S. PATENT DOCUMENTS

2005/0150215 A1*   7/2005   Taylor, III ............. F01N 13/011
                                                                  60/295
2009/0038295 A1*   2/2009   Gonze ..................... F01N 3/027
                                                                  60/295
(Continued)

FOREIGN PATENT DOCUMENTS

EP           1245814 A2     10/2002
JP         1998299458 A     11/1998
(Continued)

OTHER PUBLICATIONS

Notification Concerning Transmittal of International Preliminary Report on Patentability, App. No. PCT/JP2012/078836, Filed Nov. 7, 2012, Mailed May 21, 2015, 17 Pages.
(Continued)

*Primary Examiner* — Audrey K Bradley
(74) *Attorney, Agent, or Firm* — Berkeley Law & Technology Group, LLP

(57) ABSTRACT

An object is to prevent excessive temperature rise in a DPF during forced regeneration so that the DPF is prevented from being damaged by heat erosion or cracking and preventing a frequency of the forced regeneration from increasing so that degradation of fuel efficiency and oil dilution are reduced, in an exhaust gas purification device which removes PM in exhaust gas. A first determination unit (67) which determines whether an exhaust gas flowrate is smaller than a first threshold and is equal to or larger than a second threshold smaller than the first threshold, during forced regeneration processing by a forced regeneration control unit (65); an exhaust gas increasing control unit (69) which controls the intake throttle valve in such a manner that the exhaust gas flowrate is increased when the first determination unit (67) determines that the exhaust gas flowrate is smaller than the first threshold and is equal to or larger than the second threshold; a second determination unit (71) which determines an operation state of the exhaust gas flowrate smaller than the second threshold; and a forced regeneration interrupting unit (73) which interrupts the forced regeneration processing when the second determination unit (71) determines that the exhaust gas flowrate is smaller than the second threshold, are provided.

8 Claims, 6 Drawing Sheets

(51) Int. Cl.
*F02D 41/40* (2006.01)
*F02D 41/14* (2006.01)
*F01N 9/00* (2006.01)
*F02D 41/00* (2006.01)

(52) U.S. Cl.
CPC ........... *F01N 9/002* (2013.01); *F02D 41/0002* (2013.01); *F02D 41/1446* (2013.01); *F02D 41/401* (2013.01); *F02D 41/405* (2013.01); *F01N 2900/0408* (2013.01); *F01N 2900/1411* (2013.01); *F01N 2900/1602* (2013.01); *F01N 2900/1606* (2013.01); *Y02T 10/47* (2013.01)

(56) References Cited

U.S. PATENT DOCUMENTS

| | | | |
|---|---|---|---|
| 2012/0031072 A1* | 2/2012 | Gonze | F01N 3/101 60/273 |
| 2012/0260633 A1 | 10/2012 | Masuda et al. | |

FOREIGN PATENT DOCUMENTS

| | | |
|---|---|---|
| JP | 2002285897 A | 10/2002 |
| JP | 2003206726 A | 7/2003 |
| JP | 2004162612 A | 6/2004 |
| JP | 2005054634 A | 3/2005 |
| JP | 2006083726 A | 3/2006 |
| JP | 2006189024 A | 7/2006 |
| JP | 4164634 B2 | 10/2008 |
| JP | 2010077954 | 4/2010 |
| JP | 2010156281 A | 7/2010 |
| JP | 2011153591 A | 8/2011 |
| WO | WO 2014/073052 A1 | 5/2014 |

OTHER PUBLICATIONS

First Office Action, Japanese App. No. 2014-545485, issue Date Jan. 20, 2016, 9 Pages.

Notification of Receipt of Record Copy, Application No. PCT/JP2012/078836, Filed Nov. 7, 2012, Mailed Dec. 4, 2014, 1 Page.

International Search Report, Application No. PCT/JP2012/078836, Filed Nov. 7, 2012, Mailed Jan. 22, 2013, 4 Pages.

EPO, Extended European Search Report, App. No. 12887920.2, Mailed May 9, 2016, 6 Pages.

* cited by examiner

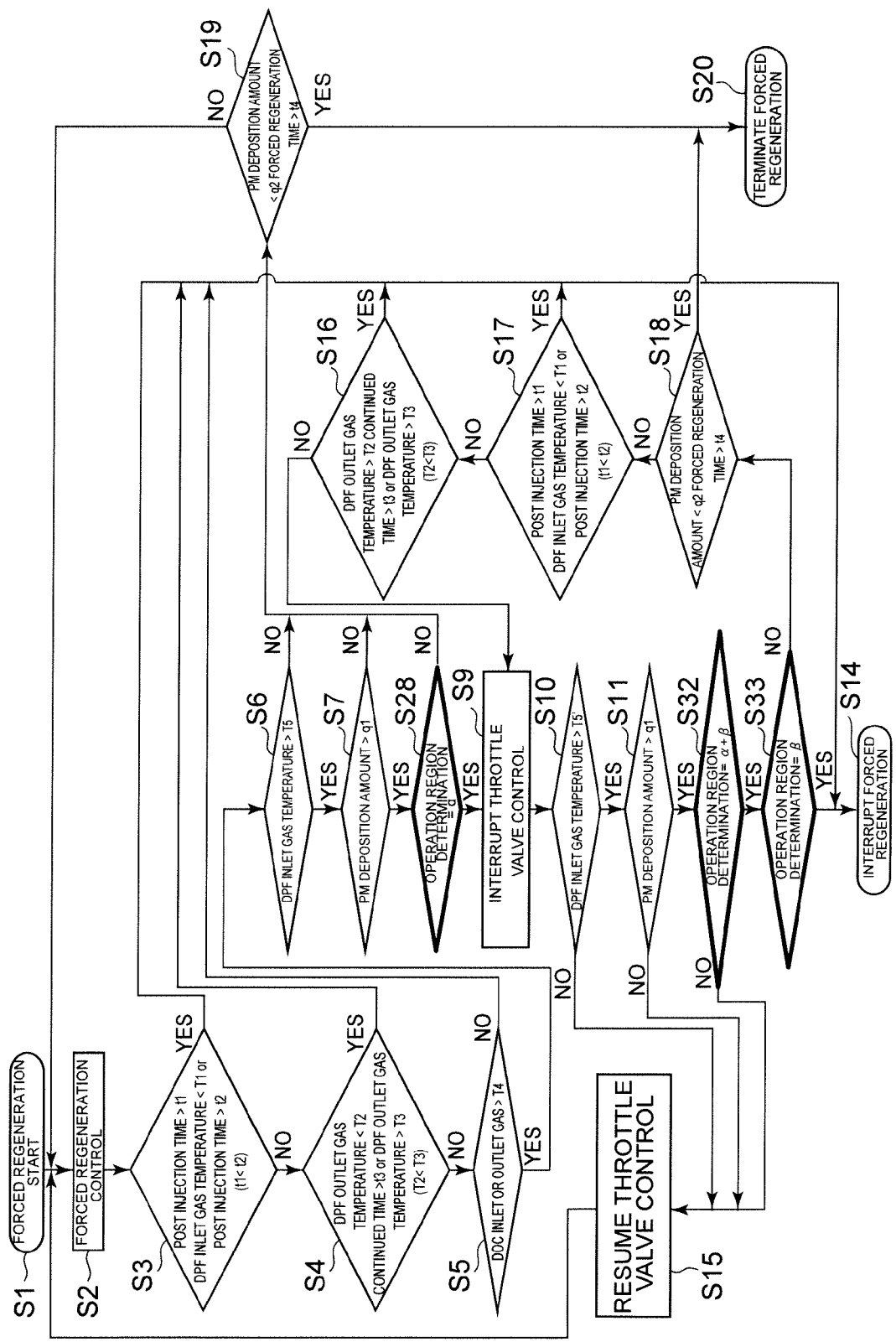

【MAP REPRESENTING REGION α】 ENGINE SPEED

| FUEL INJECTION AMOUNT (LOAD) | 800 | 1000 | 1200 | 1400 | 1600 | 1800 | 2000 | 2200 |
|---|---|---|---|---|---|---|---|---|
| 0 | 0 | 0 | 0 | 0 | 0 | 0 | 0 | 0 |
| 5 | 0 | 0 | 0 | 0 | 0 | 0 | 0 | 0 |
| 10 | 0 | 0 | 0 | 0 | 0 | 0 | 0 | 0 |
| 15 | 0 | 0 | 0 | 0 | 0 | 0 | 0 | 0 |
| 20 | 0 | 1 | 1 | 0 | 0 | 0 | 0 | 0 |
| 25 | 1 | 1 | 1 | 0 | 0 | 0 | 0 | 0 |
| 30 | 1 | 1 | 0 | 0 | 0 | 0 | 0 | 0 |
| 35 | 1 | 0 | 0 | 0 | 0 | 0 | 0 | 0 |
| 40 | 0 | 0 | 0 | 0 | 0 | 0 | 0 | 0 |
| 45 | 0 | 0 | 0 | 0 | 0 | 0 | 0 | 0 |
| 50 | 0 | 0 | 0 | 0 | 0 | 0 | 0 | 0 |
| 55 | 0 | 0 | 0 | 0 | 0 | 0 | 0 | 0 |
| 60 | 0 | 0 | 0 | 0 | 0 | 0 | 0 | 0 |

← 91

【MAP REPRESENTING REGION β】 ENGINE SPEED

| FUEL INJECTION AMOUNT (LOAD) | 800 | 1000 | 1200 | 1400 | 1600 | 1800 | 2000 | 2200 |
|---|---|---|---|---|---|---|---|---|
| 0 | 1 | 1 | 1 | 0 | 0 | 0 | 0 | 0 |
| 5 | 1 | 1 | 1 | 0 | 0 | 0 | 0 | 0 |
| 10 | 1 | 1 | 1 | 0 | 0 | 0 | 0 | 0 |
| 15 | 1 | 1 | 1 | 0 | 0 | 0 | 0 | 0 |
| 20 | 1 | 0 | 0 | 0 | 0 | 0 | 0 | 0 |
| 25 | 0 | 0 | 0 | 0 | 0 | 0 | 0 | 0 |
| 30 | 0 | 0 | 0 | 0 | 0 | 0 | 0 | 0 |
| 35 | 0 | 0 | 0 | 0 | 0 | 0 | 0 | 0 |
| 40 | 0 | 0 | 0 | 0 | 0 | 0 | 0 | 0 |
| 45 | 0 | 0 | 0 | 0 | 0 | 0 | 0 | 0 |
| 50 | 0 | 0 | 0 | 0 | 0 | 0 | 0 | 0 |
| 55 | 0 | 0 | 0 | 0 | 0 | 0 | 0 | 0 |
| 60 | 0 | 0 | 0 | 0 | 0 | 0 | 0 | 0 |

← 92

【MAP REPRESENTING REGIONS α AND β】 ENGINE SPEED

| FUEL INJECTION AMOUNT (LOAD) | 800 | 1000 | 1200 | 1400 | 1600 | 1800 | 2000 | 2200 |
|---|---|---|---|---|---|---|---|---|
| 0 | 2 | 2 | 2 | 0 | 0 | 0 | 0 | 0 |
| 5 | 2 | 2 | 2 | 0 | 0 | 0 | 0 | 0 |
| 10 | 2 | 2 | 2 | 0 | 0 | 0 | 0 | 0 |
| 15 | 2 | 2 | 2 | 0 | 0 | 0 | 0 | 0 |
| 20 | 2 | 1 | 1 | 0 | 0 | 0 | 0 | 0 |
| 25 | 1 | 1 | 1 | 0 | 0 | 0 | 0 | 0 |
| 30 | 1 | 1 | 0 | 0 | 0 | 0 | 0 | 0 |
| 35 | 1 | 0 | 0 | 0 | 0 | 0 | 0 | 0 |
| 40 | 0 | 0 | 0 | 0 | 0 | 0 | 0 | 0 |
| 45 | 0 | 0 | 0 | 0 | 0 | 0 | 0 | 0 |
| 50 | 0 | 0 | 0 | 0 | 0 | 0 | 0 | 0 |
| 55 | 0 | 0 | 0 | 0 | 0 | 0 | 0 | 0 |
| 60 | 0 | 0 | 0 | 0 | 0 | 0 | 0 | 0 |

← 93

EXHAUST GAS PURIFICATION DEVICE FOR AN INTERNAL COMBUSTION ENGINE

TECHNICAL FIELD

The present invention relates to an exhaust gas processing device in which a pre-stage oxidation catalyst and a filter that collects particulate matter are disposed in an exhaust gas path of an internal combustion engine which is, in particular, a diesel engine.

BACKGROUND

As a countermeasure against black smoke, a diesel particulate filter (DPF) has been used to collect particulate matter (PM) in exhaust gas. Forced regeneration is performed for the DPF to periodically burn and remove the collected PM. Specifically, when an estimated PM deposition amount in the DPF reaches a predetermined amount, the temperature of exhaust gas is forcibly raised so that the PM is burned to be removed.

However, depending on an operation state of the engine, abnormal combustion of the PM might occur during the forced regeneration. As a result, the excessive temperature rise might occur in the DPF, and the DPF might be damaged by heat erosion or cracking. As control for preventing the excessive temperature rise due to the abnormal combustion in the DPF, techniques in Patent Document 1 (Japanese Patent Application Laid-open No. 2011-153591) and Patent Document 2 (Japanese Patent Application Laid-open No. 2003-206726) have been known.

Patent Document 1 discloses the following technique. Specifically, when an internal combustion engine transitions from or an operation region α in a high speed state or with a high load to an operation region β with a low speed and a low load within a set time $T_1$, it is determined that the engine is in a DPF abnormal combustion occurring operation. When it is determined that the engine is in the DPF abnormal combustion occurring operation, an intake throttle valve 4 is fully opened so that an exhaust gas flowrate increases. The DPF filter device is cooled through heat removal with sensible heat of the exhaust gas. Furthermore, late post injection is continuously performed, so that oxygen concentration around the DPF filter is reduced, so that the abnormal combustion of the PM collected by the DPF filter is prevented. Thus, the abnormal temperature rise in the DPF filter device can be prevented in an early stage.

Patent Document 2 discloses the following technique. Specifically, when an engine transitions to a low load/speed region in which an exhaust gas flowrate of the engine decreases during the regeneration of the DPF, a burner is operated so that combustion gas is supplied into a turbine of a turbocharger. Thus, the turbine work is increased to facilitate turbocharging, and the heat dissipation of the DPF is facilitated as the exhaust gas flowrate of the engine increases, so that the excessive temperature rise is prevented.

CITATION LIST

Patent Literature

Patent Document 1: Japanese Patent Application Laid-open No. 2011-153591
Patent Document 2: Japanese Patent Application Laid-open No. 2003-206726

SUMMARY

Technical Problem

The excessive temperature rise in the DPF during the forced regeneration might also occur when the engine suddenly transitions to an operation state where the exhaust gas flowrate is small immediately after the regeneration, at an operation point with a relatively low load, and the operation state is maintained. Thus, the operation state causing the excessive temperature rise in the DPF during the forced regeneration cannot be accurately determined only by determining that the engine is in the DPF abnormal combustion occurring operation when the internal combustion engine transitions from or the operation region α in a high speed state or with a high load to the operation region β with a low speed and a low load within the set time $T_1$ as in Patent Document 1.

When the operation state causing the excessive temperature rise in the DPF during the forced regeneration cannot be accurately determined, a PM deposition amount triggering the regeneration (maximum deposition amount) needs to be set low so that the excessive temperature rise does not occur at the point of operation with the lowest exhaust gas flowrate in a load low state where the forced regeneration continues, to prevent the excessive temperature rise.

This leads to a shorter regeneration interval, that is, a higher interval frequency. Thus, the fuel efficiency is degraded and oil dilution increases due to the increase in an amount of fuel injected by post injection for the regeneration.

When the technique in Patent Document 2, where when an engine transitions to the low load/speed region in which an exhaust gas flowrate of the engine decreases during the regeneration of the DPF, the burner is operated so that combustion gas is supplied into the turbine of the turbocharger so that the turbine work is increased to facilitate turbocharging, and the heat dissipation of the DPF is facilitated as the exhaust gas flowrate of the engine increases, so that the excessive temperature rise is prevented, is employed, the burner and related accessory machines need to be installed. Thus, there are problems that cost is increased and that the DPF device becomes larger to be difficult to install in a small installing space.

Thus, in view of the problems of the conventional techniques, an object of the present invention is to prevent excessive temperature rise in a DPF during forced regeneration so that the DPF is prevented from being damaged by heat erosion or cracking and a frequency of the forced regeneration is prevented from increasing and to reduce degradation of fuel efficiency and oil dilution, in an exhaust gas purification device which removes PM in exhaust gas with a pre-stage oxidation catalyst and a DPF disposed in an exhaust gas path of an internal combustion engine.

Solution to Problem

To achieve the object, in the present invention, an exhaust gas purification device for an internal combustion engine in which a pre-stage oxidation catalyst and a DPF are disposed in an exhaust gas path of the internal combustion engine, PM in exhaust gas is collected by the DPF, and the DPF configured to perform a forced regeneration processing by burning the collected PM, includes: a forced regeneration control unit which controls an opening of an intake throttle valve and a post injection amount or injection time to control forced regeneration of the DPF; a first determination unit which determines whether an exhaust gas flowrate is smaller than a first threshold and is equal to or larger than a second threshold smaller than the first threshold, during forced regeneration processing by the forced regeneration control unit; an exhaust gas increasing control unit which controls the intake throttle valve in such a manner that the exhaust gas flowrate is increased when the first determination unit determines that the exhaust gas flowrate is smaller than the first threshold and is equal to or larger than the second threshold; a second determination unit which determines an operation state of the exhaust gas flowrate smaller than the second threshold; and a forced regeneration interrupting unit which interrupts the forced regeneration processing when the second determination unit determines that the exhaust gas flowrate is smaller than the second threshold.

The excessive temperature rise in the DPF during the forced regeneration might occur when the engine transitions to a state where the exhaust gas flowrate is low immediately after the regeneration is started and the state is maintained. Thus, in the present invention, predetermined first and second thresholds are set also when a large load change from a high load region to a low load region is not occurring. The first and second thresholds, as exhaust gas flowrates that are small during the forced regeneration and might cause the excessive temperature rise in the DPF during the regeneration processing, are calculated in advance through tests or simulations. When the engine changes to an operation state with the exhaust gas flowrate smaller than the first threshold and larger than the second threshold smaller than the first threshold, it is determined that the excessive temperature rise might occur in the DPF. Thus, the exhaust gas increasing control unit controls the exhaust gas increasing control unit in such a manner that the exhaust gas flowrate is increased.

Thus, the excessive temperature rise in the DPF can be prevented as follows. Specifically, the exhaust gas amount is increased, and with heat removal through sensible heat of the exhaust gas, that is, a heat dissipation effect on the exhaust gas, the DPF can be cooled, whereby the DPF can be prevented from being damaged by heat erosion or cracking.

When the exhaust gas flowrate drops to or below the second threshold, it is determined that the regeneration cannot be continued, and the forced regeneration is interrupted.

The exhaust gas flowrate is increased by controlling the intake throttle valve, and not by providing special accessory machines. Thus, the cost is not increased or the DPF device is prevented from upscaling so as not to be difficult to install in a small installing space.

Because the excessive temperature rise in the DPF can be accurately prevented, the maximum PM deposition amount triggering the forcing can be set to be higher, so that a long forced regeneration interval and a shorter forced regeneration can be achieved. Thus, the regeneration frequency can be prevented from increasing, and the post injection fuel is prevented from increasing, whereby the degradation of the fuel efficiency and the oil dilution can be reduced.

In the present invention, the forced regeneration interrupting unit may interrupt the forced regeneration processing when a DPF inlet temperature exceeds a predetermined value.

With such a configuration, the forced regeneration can be prevented from interrupting when the DPF inlet temperature is equal to or lower than the predetermined value, that is, when there is not risk of causing the excessive temperature rise. Thus, the degradation of fuel efficiency due to the repetitive regeneration as a result of the interruption and the increase in the oil dilution due to the increase in the post injection amount can be prevented.

In the present invention, the forced regeneration interrupting unit may interrupt the forced regeneration processing when a PM deposition amount exceeds a predetermined value.

With such a configuration, the forced regeneration can be prevented from interrupting when the PM deposition amount is equal to or lower than the predetermined value, that is, when there is not risk of causing the excessive temperature rise. Thus, the degradation of fuel efficiency due to the repetitive regeneration as a result of the interruption and the increase in the oil dilution due to the increase in the post injection amount can be prevented.

In the present invention, a system safety unit may be further provided which is disposed separately from the forced regeneration interrupting unit, and interrupts the forced regeneration processing when at least one of a condition that an exhaust gas temperature at an inlet or an outlet of the pre-stage catalyst drops below a predetermined temperature, a condition that an exhaust gas temperature at an outlet of the DPF exceeds a predetermined temperature, and a condition that the post injection time exceeds a predetermined time is satisfied during the forced regeneration processing.

When the exhaust gas temperature at the inlet or the outlet of the pre-stage catalyst drops to or below the predetermined temperature, it is determined that the regeneration cannot be continued due to the reduction of the load of the internal combustion engine and the like during the internal combustion engine, and the regeneration processing is interrupted.

When the exhaust gas temperature at the outlet of the DPF exceeds the predetermined temperature, it is determined that PM combustion in the DPF is in the excessive temperature rise state, and the regeneration processing is interrupted.

When the post injection time exceeds a predetermined time, the regeneration processing is interrupted to prevent the excessive temperature rise due the excessive post injection.

As described above, the forced regeneration processing is interrupted by the system safety unit provided separately from the forced regeneration interrupting unit. Thus, fail safe can be provided to prevent the DPF from being damaged by heat erosion and cracking when the control to prevent the excessive temperature rise in the DPF during the forced regeneration is not sufficiently effective.

In the present invention, the exhaust gas increasing control unit may control the intake throttle valve in such a manner that the exhaust gas flowrate is increased, by fully opening the intake throttle valve.

Thus, the exhaust gas increasing control unit fully opens the intake throttle valve to increase the exhaust gas flowrate, whereby a temperature rising prevention effect can be quickly obtained.

In the present invention, the exhaust gas increasing unit control may control the intake throttle valve in such a manner that the exhaust gas flowrate is increased, by controlling a throttle opening with an exhaust gas flowrate at a first threshold set as a target exhaust gas flowrate.

As described above, the throttle opening is controlled with the exhaust gas flowrate at the first threshold set as the target exhaust gas flowrate. Thus, compared with a case of performing control for fully opening the intake throttle valve, the exhaust gas flowrate is prevented from largely changing and thus the change in the speed of the exhaust gas flowrate can be reduced. Thus, an operation to prevent the excessive temperature rise due to the abnormal combustion in DPF can be performed without large fluctuation of the engine speed. Furthermore, slight temperature rise with the intake throttle valve can be expected, whereby the post injection amount is reduced and the degradation of the fuel efficiency and the oil dilution can be reduced.

In the present invention, the first determination unit and the second determination unit may perform the determination respectively based on a first determination map and a second determination map each representing an operation area defined by an engine speed and a torque of the internal combustion engine.

As described above, the first determination unit and the second determination unit are represented by the two dimensional first and second determination maps defined by the engine speed and the load of the internal combustion engine. Thus, the state of the exhaust gas flowrate corresponding to an operation state of the internal combustion engine can be easily and accurately determined.

In the present invention, the first determination map and the second determination map may be formed as a single map.

As described above, the single map is formed by the first determination map and the second determination map. Thus, the storage capacity of a control device can be reduced and the control device can be simplified.

Advantageous Effects

In the present invention, in view of the problems of the conventional techniques, excessive temperature rise in a DPF during forced regeneration is prevented so that the DPF is prevented from being damaged by heat erosion or cracking, and the maximum PM deposition amount can be set to be high so that degradation of fuel efficiency and oil dilution are reduced, in an exhaust gas purification device which removes PM in exhaust gas with a pre-stage oxidation catalyst and a DPF disposed in an exhaust gas path of an internal combustion engine.

BRIEF DESCRIPTION OF DRAWINGS

FIG. 6 is a control flowchart in a third embodiment.

DETAILED DESCRIPTION

Embodiments of the present invention shown in the accompanying drawings will now be described in detail. It is intended, however, that dimensions, materials, shapes, relative positions, and the like of components described in the embodiments shall be interpreted as illustrative only and not limitative of the scope of the present invention unless otherwise specified.

First Embodiment

A first embodiment of the present invention is described with reference to FIGS. 1 to 4.

Figure 1:
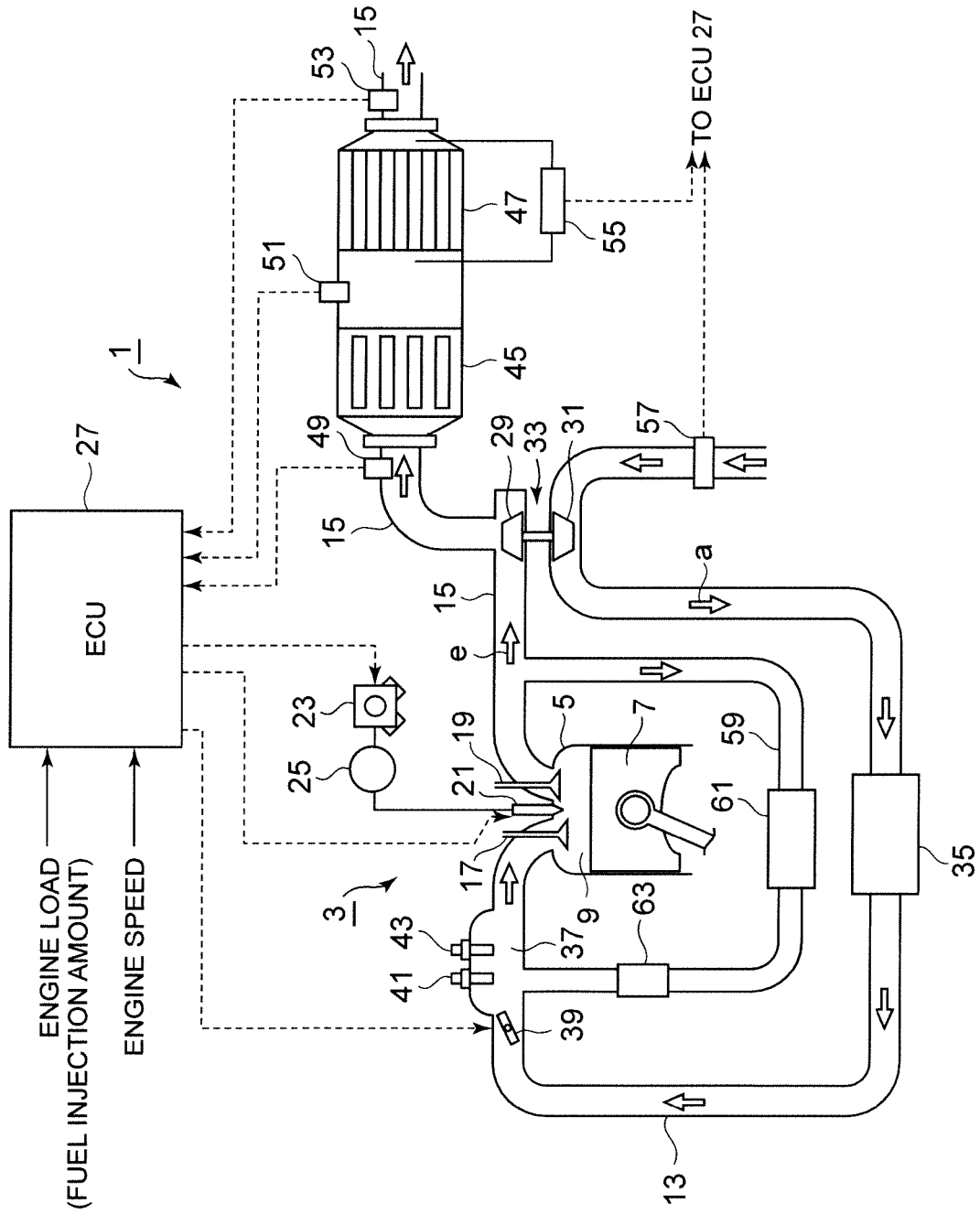
FIG. 1 is a diagram illustrating an entire configuration of a first embodiment of the present invention in which an exhaust gas purification device is disposed in an engine.

FIG. 1 illustrates an overall configuration of a first embodiment in which an exhaust gas purification device 1 according to the present invention is applied to a diesel engine (hereinafter, referred to as an engine) 3.

In FIG. 1, a cylinder 5 of the engine 3 incorporates a piston 7. A combustion chamber 9 is formed above the piston 7. An intake pipe 13 and an exhaust pipe 15 are connected to a cylinder head. An intake valve 17 and an exhaust valve 19 are disposed in connection portions between the combustion chamber 9 and an intake port and a discharge port in the cylinder head to which the intake pipe 13 and the exhaust pipe 15 are connected.

A fuel injector 21 is disposed at the center of an upper portion of the cylinder head. The fuel injector 21 injects fuel into the combustion chamber 9. Fuel, such as diesel fuel, at high pressure is supplied to the fuel injector 21 from an injector pump 23 through a common rail (accumulator) 25, and the fuel is injected into the combustion chamber 9.

Timing and an amount of fuel injection are controlled by a control device (ECU) 27. The injected fuel is mixed with air supplied through the intake pipe 13 and the intake port, and the resultant fuel-air mixture is compressed and ignited to be burned in the combustion chamber 9.

The engine 3 includes an exhaust turbocharger 33 including: an exhaust turbine 29 disposed in the exhaust pipe 15; and a compressor 31 disposed in the intake pipe 13 and coaxially driven with the exhaust turbine 29. Supplied air a discharged from the compressor 31 of the exhaust turbocharger 33 is cooled in an intercooler 35 while passing through the intake pipe 13, and then enters a supply air chamber 37. An intake throttle valve 39 that controls a flowrate of the supply air flowing in the intake pipe 13, is disposed on an inlet side of the intake pipe 13. A supply air pressure sensor 41 and a supply air temperature sensor 43 are disposed in the supply air chamber 37.

A pre-stage oxidation catalyst (DOC) 45 and a DPF (filter device) 47, on the downstream side of the pre-stage oxidation catalyst 45, are disposed in a portion in the exhaust pipe 15 on a downstream side of the exhaust turbine 29. The combustion gas, obtained by the combustion in the combustion chamber 9, that is, exhaust gas e is discharged into the exhaust pipe 15 and drives the exhaust turbine 29 of the exhaust turbocharger 33. Thus, the exhaust gas e serves as a driving source of the compressor 31. Then, the exhaust gas e passes through the pre-stage oxidation catalyst 45 and the DPF 47. PM in the exhaust gas e is collected by the DPF 47.

The exhaust gas e, from which the PM is removed by the DPF 47, is discharged to the outside through an unillustrated muffler.

Temperature sensors 49, 51, and 53 are disposed in the exhaust pipe 15 and on an inlet side of the pre-stage oxidation catalyst 45 and on the inlet side and the outlet side of the DPF 47. The temperature sensors 49, 51, and 53 detect the temperature of the exhaust gas e.

A pressure difference sensor 55 that detects the difference in pressure between the exhaust gas e at the inlet and the exhaust gas e at the outlet of the DPF 47 is disposed. An intake flowrate meter (airflow sensor) 57 is disposed in an inlet portion of the intake pipe 13.

An EGR pipe 59 is disposed between the intake pipe 13 and the exhaust pipe 15. An EGR cooler 61 and an EGR valve 63 are disposed in the EGR pipe 59. The EGR valve 63 controls an amount of exhaust gas flowing in the EGR pipe 59. The exhaust gas e partially passes through the EGR pipe 59 I to be cooled by the EGR cooler 61 and return to the supply air chamber 37. Thus, the amount of oxygen in the supply air is reduced, whereby the combustion temperature at the peak point is lowered, so that the amount of produced $NO_X$ is reduced.

Detected values of the temperature sensors 49, 51, and 53, the pressure difference sensor 55, and the intake flowrate meter 57 as well as an opening signal of the intake throttle valve 39 are input to the control device (ECU) 27.

An engine load signal or a fuel injection amount signal and an engine speed signal are input to the control device 27. The control device 27 controls the fuel injector 21, the injector pump 23, the intake throttle valve 39, the EGR valve 63, and the like based on the input values, and thus controls the operation of the engine 3.

Next, the control device 27 is described.

Figure 2:
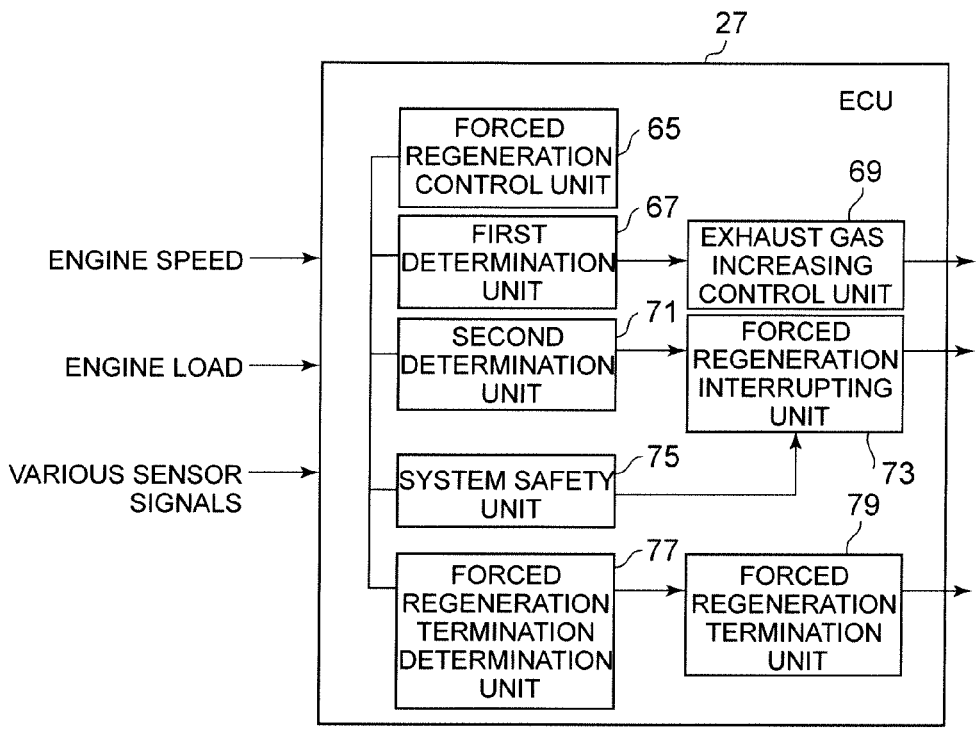
FIG. 2 is a configuration block diagram illustrating a configuration of a control device.

As shown in FIG. 2, the control device 27 includes: a forced regeneration control unit 65 which controls an opening of the intake throttle valve 39 and a post injection amount or injection time to control forced regeneration of the DPF 47; a first determination unit 67 which determines whether an exhaust gas flowrate is smaller than a first threshold and is equal to or larger than a second threshold smaller than the first threshold, during forced regeneration processing by the forced regeneration control unit 65; an exhaust gas increasing control unit 69 which controls the valve opening of the intake throttle valve 39 in such a manner that the exhaust gas flowrate is increased when the first determination unit determines that the exhaust gas flowrate is smaller than the first threshold and is equal to or larger than the second threshold; a second determination unit 71 which determines an operation state of the exhaust gas flowrate smaller than the second threshold; and a forced regeneration interrupting unit 73 which interrupts the forced regeneration processing when the second determination unit 71 determines that the exhaust gas flowrate is smaller than the second threshold.

The forced regeneration control unit 65 starts the regeneration processing when a predetermined amount of PM is deposited on the DPF 47. For example, whether to start the forced regeneration processing while the engine is under operation is determined based on an estimated amount of the PM deposited on the DPF, engine operation time, a traveling distance of a vehicle, a fuel consumption amount, and a difference between pressures before and after the DPF 47 detected by the pressure difference sensor 55.

When the forced regeneration control unit 65 issues an instruction to start the regeneration, control of opening the intake throttle valve 39 is first performed. In this control, an exhaust temperature is raised and the DOC 45 is activated, and also the high exhaust temperature is maintained, whereby an oil dilution amount is reduced.

When the DOC 45 is activated and a condition is satisfied, an instruction indicating injection timing is issued to the fuel injector 21 so that the post injection of fuel is performed on the combustion chamber 9 after the main injection of the fuel. Thus, the fuel injected by the post injection after the main injection is not completely burned, and is discharged to the exhaust pipe 15.

An unburnt HC component injected by the post injection is oxidized by a catalyst action of the activated pre-stage oxidation catalyst 45, and with resultant heat of reaction, the temperature of the exhaust gas e is raised to about 600° C. or higher. The exhaust gas e, heated up to 600° C. or higher, facilitates the combustion of PM collected by the DPF 47, whereby the PM is removed from the DPF 47.

When the control of the forced regeneration starts and thus the PM deposited in the DPF 47 starts to burn, a predetermined exhaust gas flowrate needs to be ensured because a predetermined amount of oxygen concentration in the exhaust gas is required, until the PM is completely burned.

Figure 3:
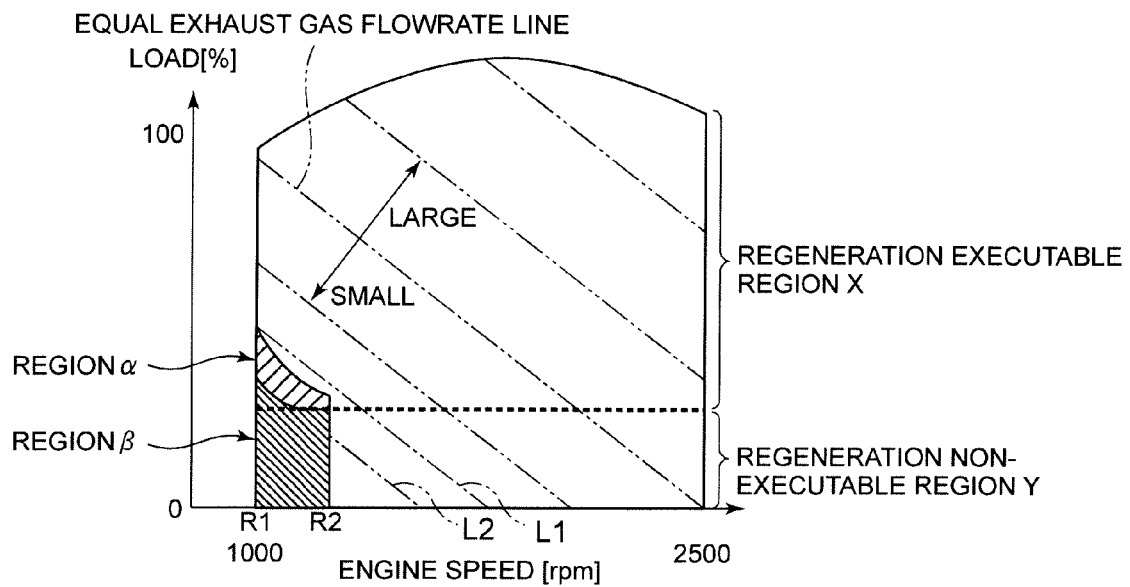
FIG. 3 is a diagram illustrating operation regions in regeneration interruption control and intake throttle valve control.

FIG. 3 illustrates how an operation state of the engine and an exhaust gas flowrate change. The figure illustrates a regeneration executable region X and a regeneration non-executable region Y.

A region α in FIG. 3 is a region in which forced regeneration can be continuously performed without causing abnormal combustion, through valve opening control by interrupting closing control of the intake throttle valve 39.

When the engine speed and the load the engine 3 fall within the region α, the closing control of the intake throttle valve 39 for the forced regeneration is interrupted and the opening control is performed so that the exhaust gas flowrate increases, whereby the excessive temperature rise can be prevented. The maximum PM deposition amount can be set higher in accordance with the increase in the exhaust gas flowrate.

The first determination unit 67 determines whether the operation state of the engine 3 has entered the region α. When the operation state has entered the region α, the exhaust gas increasing control unit 69 interrupts the closing control of the intake throttle valve 39 to perform the opening control, whereby the exhaust gas flowrate is controlled in such a manner as to be increased, so that the regeneration can be continuously performed.

A region β in FIG. 3 is a region in which the abnormal temperature rise is difficult to prevent because an enough exhaust gas amount cannot be achieved even when the exhaust gas flowrate is increased by the opening control performed by terminating the closing control of the intake throttle valve 39.

The second determination unit 71 determines whether the operation state of the engine 3 has entered the region β. When the operation state enters the region β, the forced regeneration interrupting unit 73 interrupts the forced regeneration control, so that the closing control of the intake throttle valve 39 is interrupted. Thus, opening control corresponding to the operation state of the engine 3 is performed, and the instruction to perform the post injection is cancelled.

More specifically, the ranges of the regions α and β are ranges substantially defined by slanted equal exhaust gas flowrate lines L1 and L2 between predetermined engine speeds (R1 and R2). An upper border lines of the regions α and β, are curved lines similar to the exhaust gas flowrate lines L1 and L2.

The control device 27 further includes a system safety unit 75 and a forced regeneration termination determination unit 77. The system safety unit 75 does not determine that the operation state of the engine 3 has entered the region β with the second determination unit 71 and interrupts the forced regeneration in accordance with the result as described above. Instead, the system safety unit 75 detects the exhaust gas temperature at the inlet or the outlet of the pre-stage oxidation catalyst 45 with the temperature sensor 49 or 51 during the forced regeneration control, and compares the detected temperature with a threshold to make a determination. When the detected temperature falls below the predetermined temperature, the system safety unit 75 determines that the regeneration cannot be continued due to the reduction of the engine load during the forced regeneration, and thus interrupts the regeneration processing.

Furthermore, the exhaust gas temperature at the outlet of the DPF 47 is detected by the temperature sensor 53, and the determination is made based on the detected temperature. When the detected temperature exceeds the predetermined threshold temperature, it is determined that the PM combustion in the DPF 47 is in the abnormally high temperature state, and the regeneration processing is interrupted.

Furthermore, the injection time of the post injection may be detected and integrated, and when the integrated time exceeds a predetermined time, the regeneration is interrupted to prevent the abnormal temperature rise caused by the excessive post injection due to slipping of HC when the DOC is clogged. The number of injections may be integrated as the injection time, and the injection time may be calculated in any other way as long as the injection period can be compared with the predetermined threshold to make the determination.

As described above, the determination to interrupt the forced regeneration processing with the system safety unit 75 is performed in addition to the condition for interrupting the forced regeneration with the system safety unit 75. Thus, the DPF 47 can be surely prevented from being damaged by heat erosion or cracking, with the control for interrupting the forced regeneration prepared as fail safe in addition to the interruption of the forced regeneration by the second determination unit 71.

When the PM deposition amount drops below a predetermined value and the predetermined time elapses after the regeneration has started, the forced regeneration termination determination unit 77 determines that the forced regeneration is completed, and terminates the forced regeneration. Specifically, the closing control of the intake throttle valve 39 is terminated, and the injection control of the post injection is terminated.

A specific control flow of the control device 27 having the configuration described above is described with reference to FIG. 4.

When the forced regeneration starts in step S1, that is, when it is determined that the regeneration is required because the predetermined amount of PM is deposited and a condition to perform the forced regeneration is satisfied, based on the engine operation time, the traveling distance of the vehicle, the fuel consumption amount, and a signal from the pressure difference sensor 55 that detects the difference between pressures before and after the DPF 47, the forced regeneration control starts in step S2.

In the forced regeneration control, as described above, the pre-stage oxidation catalyst 45 is activated through the opening control of the intake throttle valve 39 and the control of the post injection after the main injection. Thus, the exhaust gas temperature rises to about 600° C. at which the combustion of the PM in the DPF 47 is facilitated.

Then, in step S3, the post injection time is detected. Whether the detected time exceeds the predetermined time t1 is determined and the whether the gas temperature at the inlet of the DPF 47 is lower than the threshold T1 is determined based on the detected signal from the temperature sensor 51. Alternatively, whether the post injection time exceeds the predetermined time t2 is simply determined. Through these determinations, the abnormal temperature rise due to the excessive post injection is prevented when the temperature at the DPF 47 does not sufficiently rise due to a failure such as clogging of the pre-stage oxidation catalyst 45.

When the result of the determination in step S3 is Yes, the processing proceeds to step S14 where the forced regeneration is interrupted so that the heat loss due to the excessive temperature rise in the DPF 47 is prevented. When the result is No, the processing proceeds to step S4.

In step S4, whether the gas temperature at the outlet of the DPF 47 exceeds the threshold T2 is determined based on the detected signal from the temperature sensor 53, and whether the continued time exceeds t3 is determined. Alternatively, whether the gas temperature at the outlet of the DPF 47 exceeds the threshold T3 is simply determined Through these determinations, whether the PM is in the abnormal combustion state in the DPF 47 is determined. When the PM is in the abnormal combustion state, the result of the determination in step S4 is Yes, and the processing proceeds to step S14 where the forced regeneration is interrupted to prevent the abnormal temperature rise. When the result is No, the processing proceeds to step S5.

In step S5, whether the gas temperature at the inlet or the outlet of the pre-stage oxidation catalyst (DOC) 45 exceeds the threshold T4 is determined based on the detected signal from the temperature sensor 49 or 51. When the result of the determination is No, the processing proceeds to step S14 where the forced regeneration is interrupted. Thus, it is determined that the engine is in the operation state in which the regeneration cannot continue due to the lowering of the engine load during the forced regeneration. As a result, the forced regeneration is interrupted to prevent the unnecessary post injection, whereby the forced regeneration control is adjusted so that the regeneration is efficiently performed. When the result is Yes, the processing proceeds to step S6.

Through steps S3, S4, and S5 described above, a basic safety function is controlled in the forced regeneration control (a section D in FIG. 4), and thus the control by the system safety unit 75 is performed.

Figure 4:
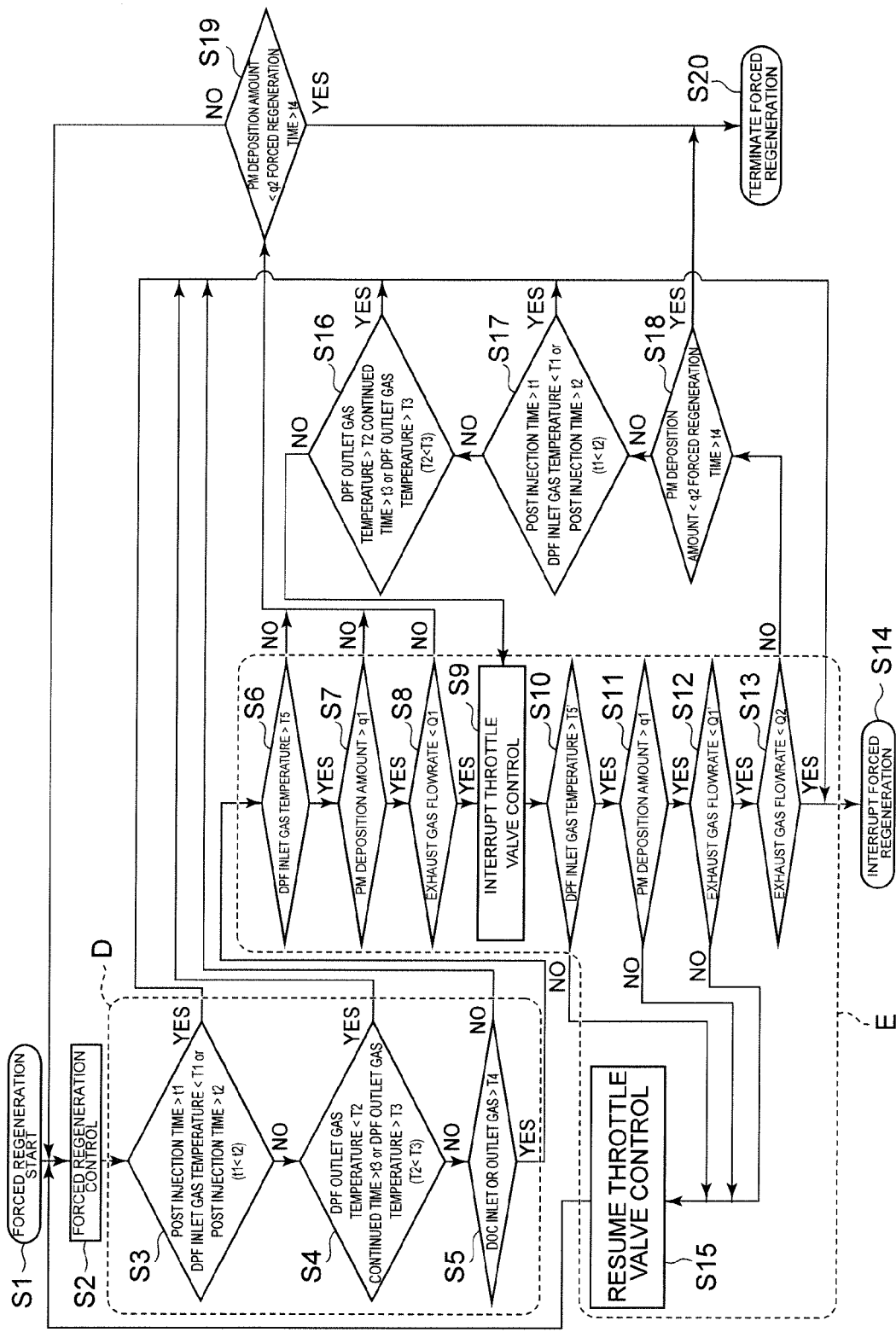
FIG. 4 is a control flowchart in the first embodiment.

The control for preventing the excessive temperature rise during the forced regeneration through determination based on the exhaust gas flowrate, that is, the control by the first determination unit 67 and the second determination unit 71 are performed in steps S6 to S13 and S15 described later (a section E in FIG. 4).

In step S6, whether the gas temperature at the inlet of the DPF 47 exceeds the threshold T5 is determined based on the detected signal from the temperature sensor 51. When the result of the determination is No, that is, when the temperature does not exceed the threshold, the processing proceeds to step S19 where it is determined whether the PM deposition amount is smaller than q2 and the forced regeneration time exceeds t4. When the result of the determination is Yes, it is determined that the regeneration is completed and the forced regeneration is terminated in step S20. When the result of the determination is No, the processing returns to step S2 and the forced regeneration control is repeated.

When the result of the determination in step S6 is Yes, the PM deposition amount is calculated in step S7, where it is determined whether the deposition amount exceeds a threshold q1. When the result of the determination is No, the processing proceeds to step S19 as in the case of step S6. When the result of the determination is Yes, the processing proceeds to step S8. The PM deposition amount is calculated and estimated based on the operation conditions of the engine 3 such as the integrated amount of the difference between the amount of PM discharged from the engine based on the operation state and the amount of regenerated PM that is completely burned in the DPF 47, the difference between the pressures before and after the DPF 47, and the fuel injection time.

In step S8, whether the exhaust gas flowrate is lower than a threshold Q1, corresponding to the equal exhaust gas flowrate line L1 illustrated in FIG. 3, is determined.

As the exhaust gas flowrate, a value calculated and estimated based on the detected value from the intake flowrate meter (airflow sensor) 57, the engine speed, the fuel injection amount, the supply air pressure amount from the supply air pressure 41, the supply air temperature signal from the supply air temperature sensor 43, or the like, may be used.

When the exhaust gas flowrate is not smaller than the threshold Q1, that is, when the result of the determination is No, the operation state may enter the regeneration non-executable region Y in FIG. 3 depending on the engine speed and the load. Still, the engine speed is in mid to high speed range, and thus the excessive temperature rise in the DPF 47 is unlikely to occur. Thus, the processing proceeds to step S19, where it is determined whether the regeneration has been completed.

When the exhaust gas flowrate is smaller than the threshold Q1, that is, when the result of the determination is Yes, the operation state is likely to enter the regeneration non-executable region Y. Thus, the processing proceeds to step S9 where the closing control of the intake throttle valve 39 is interrupted, and the intake throttle valve 39 is fully opened. The exhaust gas flowrate may be increased by increasing the engine speed in any other way.

Whether the operation state is in the operation region as the region α or β in FIG. 3 may be determined based on the engine speed and the load after the determination on the exhaust gas flowrate in step S8. Thus, temperature rise control can be performed with higher accuracy.

More specifically, the determination based on the calculated value of the exhaust gas flowrate is a determination in a range including the regions α and β with low engine speed that is especially likely to involve the excessive temperature rise as indicated by the equal exhaust gas flowrate lines L1 and L2. Thus, whether the engine is in the operation state with a low exhaust gas flowrate that is especially likely to involve the excessive temperature rise can be determined more accurately, by determining whether the operation state, based on the engine speed and the load, is in the region α or β.

After the closing control of the intake throttle valve 39 is interrupted in step S9, in step S10, whether the gas temperature at the inlet of the DPF 47 exceeds a threshold T5' is determined based on the detected signal from the temperature sensor 51. When the result of the determination is No, it is determined that the excessive temperature state of the PM will end, and thus the processing proceeds to step S15 where the closing control of the intake throttle valve 39 is resumed or the engine speed increasing control is terminated, and the forced regeneration is controlled again.

When the result of the determination in step S10 is Yes, it is determined that the excessive temperature state continues. In step S11, whether the PM deposition amount exceeds the threshold q1 is determined. When the PM deposition amount exceeds the threshold q1, the result is Yes, and thus it is determined that the excessive temperature rise state might occur because there is a remaining amount of deposition, and the processing proceeds to step S12. When the PM deposition amount does not exceed the threshold q1, the result is No, and it is determined that the excessive temperature rise is unlikely to occur, and the processing proceeds to step S15 where the closing control of the intake throttle valve 39 is resumed or the engine speed increasing control is terminated, and the forced regeneration is controlled again.

In step S12, whether the exhaust gas flowrate is smaller than threshold Q1' larger than the threshold Q1 is determined.

When the result of the determination in step S12 is No, it is determined that the exhaust gas flowrate is larger than the threshold Q1 and thus the excessive temperature rise is unlikely to occur, and the processing proceeds to step S15. When the result of the determination is Yes, the processing proceeds to step S13 where it is determined whether the exhaust gas flowrate is larger than the threshold Q2 smaller than the threshold Q1. The threshold Q2 corresponds to the exhaust gas flowrate line L2 in FIG. 3.

When the exhaust gas flowrate is smaller than the threshold Q2, there is a high risk that the excessive temperature rise occur, and thus the processing proceeds to step S14 where the forced regeneration is interrupted.

When the result of the determination in step S13 is No, the processing proceeds to step S18 where it is determined whether the PM deposition amount is smaller than q2 and the forced regeneration time exceeds t4. When the result of the determination is Yes, it is determined that the regeneration is completed, and the forced regeneration is terminated in step S20. When the result of the determination is No, the processing proceeds to step S17 and S16 where it is determined whether the forced regeneration needs to be interrupted as in step S3 and S4. When the result of any of the determinations is Yes, the processing proceeds to step S14 where the forced determination is interrupted.

When the result of the determination in step S17 or S16 is No, the processing returns to step S9, where the closing control of the intake throttle valve 39 is interrupted and the intake throttle valve 39 is fully opened. The exhaust gas flowrate may be increased by increasing the engine speed in a way other than fully opening the intake throttle valve 39.

An example of specific numeral values in the description of the control flow is described below.

T1: 500° C., T2: 750° C., T3: 800° C., T4: 240° C., T5: 570° C., T5': 570° C., q1: 4 g/L, q2: 1 g/L, t1: 2 min, t2: 30 min, t3: 10 sec, t4: 10 min, Q1: 100 kg/h, Q1': 120 kg/h, Q2: 70 kg/h.

When the exhaust gas flowrate, changed trough the control flow in the control device 27 having the configuration described above, is smaller than the threshold Q1 as the first threshold, the operation state is in a regeneration border region Z or the regeneration un-executable region Y in FIG. 3. Thus, the closing control of the intake throttle valve is interrupted and the intake throttle valve is fully opened, whereby the gas amount is increased. Thus, the DPF 47 can be cooled and the temperature rise can be prevented by heat removal through the sensible heat of the exhaust gas, that is, by heat dissipation effect on the exhaust gas.

When the exhaust gas flowrate drops to or below Q2 as the second threshold, the operation state is in the regeneration non-executable area Y, whereby it is determined that the regeneration cannot be continued and the forced regeneration is interrupted. Thus, the DPF 47 can be prevented from being damaged by heat erosion or cracking.

The exhaust gas flowrate is increased by controlling the intake throttle valve 39, and not by providing accessory machines. Thus, the cost is not increased or the DPF device is prevented from upscaling so as not to be difficult to install in a small installing space.

Whether the engine is in the operation state with a low exhaust gas flowrate that is likely to cause excessive temperature rise in the DPF 47 can be accurately determined by using the exhaust gas flowrate. Thus, the maximum PM deposition amount at which the forcing starts can be set to be higher, whereby the interval of the forced regeneration can be increased, and the post injection fuel used for the regeneration can be prevented from increasing, whereby degradation of the fuel efficiency or the oil dilution can be reduced.

Second Embodiment

Next, a second embodiment is described with reference to a control flowchart in FIG. 5. The second embodiment is only different from the first embodiment in that steps S9 and S15 in the flowchart in FIG. 4 are replaced with steps S29 and S35.

The other configurations, which are the same, are denoted with the same step numbers and the description thereof is omitted.

Figure 5:
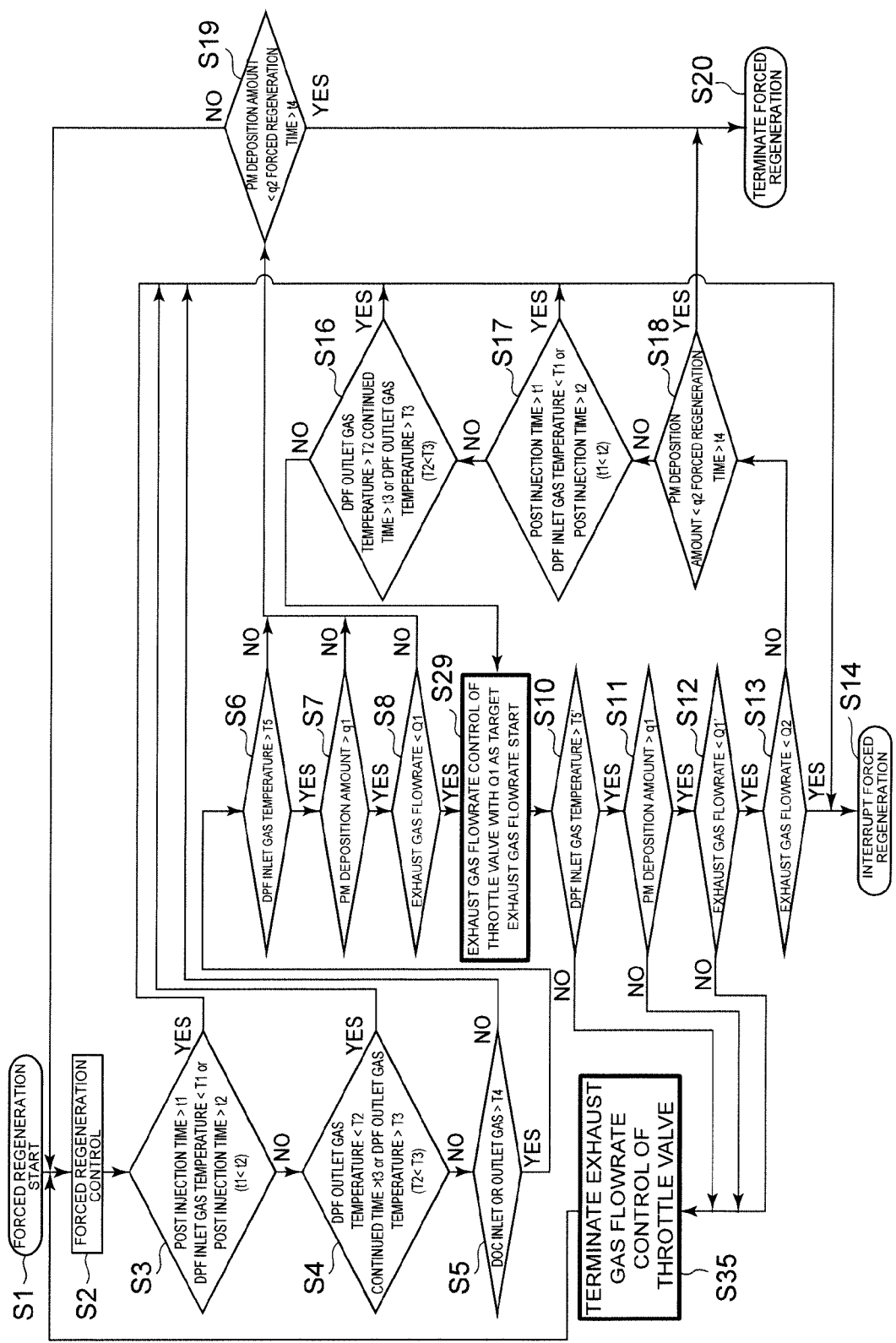
FIG. 5 is a control flowchart in a second embodiment.

In step S19 in FIG. 5, the control for fully opening the intake throttle valve 39 is not performed. Instead, the opening control of the intake throttle valve is performed with the target exhaust gas flowrate at the first threshold Q1 set as a target exhaust gas flowrate In step S25, the opening control of the intake throttle valve 39, with Q1 set as the target exhaust gas flowrate is terminated.

In the second embodiment, the opening of the intake throttle valve 39 is controlled with the exhaust gas flowrate at the first threshold Q1 set as the target exhaust gas flowrate. Thus, compared with the control for fully opening the valve, the fluctuation of the exhaust gas flowrate is smaller, and thus the fluctuation of the engine speed of the engine 3 can be reduced. Thus, the operation to prevent the excessive temperature rise due to the abnormal combustion in the DPF 47 can be achieved without large fluctuation of the engine speed. Furthermore, the oil dilution amount can be prevented from increasing due to the lowered exhaust temperature caused by excessive opening of the throttle valve.

Third Embodiment

Next, a third embodiment is described with reference to a control flowchart in FIG. 6 and FIGS. 7A to 7D. The third embodiment is only different from the first embodiment in that steps S8, S12, and S13 in the flowchart in FIG. 4 are replaced by steps S28, S32, and S33. The other configurations, which are the same, are denoted with the same step numbers and the description thereof is omitted.

In FIG. 6, the exhaust gas flowrate is not calculated in step S28. Instead, a region in which the excessive temperature rise might occur due to the reduction of the exhaust gas flowrate is set in advance with a two dimensional map based on the engine speed and the load. The region α is the same as that described in the first embodiment. In step S28, whether the operation state of the engine 3 is in the region α is determined based on detection signals indicating the engine speed and the load.

In step S32, whether the operation state is in a region α+β is determined. When the result is No, it is determined that the exhaust gas flowrate has increased to be in a region other than the region α+β, that is, a region involving no risk of causing the excessive temperature rise, and the processing proceeds to step S15. When the result of determining whether the operation state is in a region α+β in step S32 is Yes, whether the operation state is in the region β is determined in step S33. When the operation state is in the region β, the forced regeneration is interrupted in step S14. The other configurations are the same as the first embodiment.

Figures 7A, 7B, 7C, 7D:
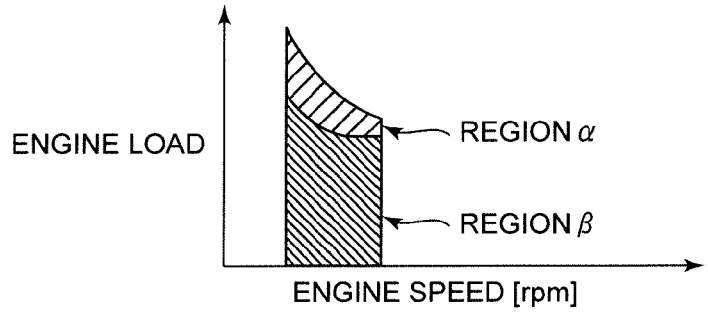
FIGS. 7A to D are diagrams illustrating operation regions of determination maps in the third embodiment, in which 7A illustrates the operation regions, 7B is a diagram illustrating a data configuration of a first determination map, and 7C is a diagram illustrating a data configuration of a second determination map, and 7D is a diagram illustrating a data configuration in which the first determination map and the second determination map are integrated.

A first determination map 91, representing the operation region α, is a two-dimensional map including a data arrangement in FIG. 7B. A second determination map 92, representing the operation region β, is a two dimensional map including a data arrangement in FIG. 7C.

An integrated map 93, as the first determination map 91 and the second determination map 92 integrated into a single map, may be formed. The integrated map 93 is a two dimensional map including a data arrangement in FIG. 7D.

In the third embodiment, the regions α and β are respectively represented by the two-dimensional first determination map 91 and the two-dimensional second determination map 92 each being defined by the engine speed and the load of the engine 3. Thus, the state of the exhaust gas flowrate, corresponding to the operation state of the engine 3, can be easily and accurately determined.

The first determination map 91 and the second determination map 92 may be formed as the single integrated map 93. When the first determination map 91 and the second determination map 92 are formed as the single integrated map 93, the storage capacity of the control device 27 can be reduced, and the thus the control device 27 can be simplified.

INDUSTRIAL APPLICABILITY

With the present invention, in an exhaust gas purification device which removes PM in exhaust gas with a pre-stage oxidation catalyst and a DPF disposed in an exhaust gas path of an internal combustion engine, excessive temperature rise in the DPF during forced regeneration can be prevented so that the DPF can be prevented from being damaged by heat erosion and cracking. Furthermore, frequency of forced regeneration can be prevented from increasing, whereby degradation of fuel efficiency and oil dilution can be reduced. All things considered, the technique can be suitably applied to an exhaust gas purification device for a diesel engine.

REFERENCE SIGNS LIST 1 exhaust gas purification device
3 engine (internal combustion engine)
11 intake pipe
15 exhaust pipe (exhaust gas path)
21 fuel injector
27 control device (ECU)
39 intake throttle valve (intake throttle valve)
45 pre-stage oxidation catalyst
47 DPF
65 forced regeneration control unit
67 first determination unit
69 exhaust gas increasing control unit
71 second determination unit
73 forced regeneration interrupting unit
75 system safety unit
77 forced regeneration termination determination unit
79 forced regeneration termination unit
91 first determination map
92 second determination map
93 integrated map
α, β operation region
X regeneration executable region
Y regeneration non-executable region
Z regeneration border region
L1, L2 equal exhaust gas flowrate line

The invention claimed is:

1. An exhaust gas purification device for an internal combustion engine in which a pre-stage oxidation catalyst and a DPF are disposed in an exhaust gas path of the internal combustion engine, PM in exhaust gas is collected by the DPF, and the DPF configured to perform a forced regeneration processing by burning the collected PM, the exhaust gas purification device comprising:

a forced regeneration control unit which controls an opening of an intake throttle valve and a post injection amount or injection time to control forced regeneration of the DPF;

a first determination unit which determines that an exhaust gas flowrate smaller than a first threshold and equal to or larger than a second threshold smaller than the first threshold is an exhaust gas flowrate with which the forced regeneration can be continued while preventing excessive temperature rise in the DPF by performing opening control of the intake throttle valve, during forced regeneration processing by the forced regeneration control unit;

an exhaust gas increasing control unit which positions the intake throttle valve in such a manner that the exhaust gas flowrate is increased when the first determination unit determines that the exhaust gas flowrate is smaller than the first threshold and is equal to or larger than the second threshold;

a second determination unit which determines that the exhaust gas flowrate smaller than the second threshold is an exhaust gas amount with which the forced regeneration is difficult to continue while preventing the excessive temperature rise in the DPF by performing the opening control of the intake throttle valve; and a forced regeneration interrupting unit which interrupts the forced regeneration processing when the second determination unit determines that the exhaust gas flowrate is smaller than the second threshold.

2. The exhaust gas purification device for an internal combustion engine according to claim 1, wherein the forced regeneration interrupting unit interrupts the forced regeneration processing when a DPF inlet temperature exceeds a predetermined value.

3. The exhaust gas purification device for an internal combustion engine according to claim 1, wherein the forced regeneration interrupting unit interrupts the forced regeneration processing when a PM deposition amount exceeds a predetermined value.

4. The exhaust gas purification device for an internal combustion engine according to claim 1, further comprising a system safety unit which is disposed separately from the forced regeneration interrupting unit, and interrupts the forced regeneration processing when at least one of a condition that an exhaust gas temperature at an inlet or an outlet of the pre-stage catalyst drops below a predetermined temperature, a condition that an exhaust gas temperature at an outlet of the DPF exceeds a predetermined temperature, and a condition that the post injection time exceeds a predetermined time is satisfied during the forced regeneration processing.

5. The exhaust gas purification device for an internal combustion engine according to claim 1, wherein the exhaust gas increasing control unit positions the intake throttle valve in such a manner that the exhaust gas flowrate is increased, by fully opening the intake throttle valve.

6. The exhaust gas purification device for an internal combustion engine according to claim 1, wherein the exhaust gas increasing control unit positions the intake throttle valve in such a manner that the exhaust gas flowrate is increased, by controlling a throttle opening with an exhaust gas flowrate at a first threshold set as a target exhaust gas flowrate.

7. The exhaust gas purification device for an internal combustion engine according to claim 1, wherein the first determination unit and the second determination unit perform the determination respectively based on a first determination map and a second determination map each representing an operation area defined by an engine speed and a torque of the internal combustion engine.

8. The exhaust gas purification device for an internal combustion engine according to claim 7, wherein the first determination map and the second determination map are formed as a single map.

* * * * *